United States Patent
Yamaguchi et al.

(10) Patent No.: US 12,283,698 B2
(45) Date of Patent: Apr. 22, 2025

(54) CYLINDRICAL BATTERY

(71) Applicant: SANYO Electric Co., Ltd., Daito (JP)

(72) Inventors: Yuma Yamaguchi, Osaka (JP); Shuichi Yamashita, Tokushima (JP); Takahiro Fukuoka, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 140 days.

(21) Appl. No.: 16/629,182

(22) PCT Filed: Jul. 18, 2018

(86) PCT No.: PCT/JP2018/026895
§ 371 (c)(1),
(2) Date: Jan. 7, 2020

(87) PCT Pub. No.: WO2019/017382
PCT Pub. Date: Jan. 24, 2019

(65) Prior Publication Data
US 2020/0136097 A1 Apr. 30, 2020

(30) Foreign Application Priority Data
Jul. 20, 2017 (JP) .................................. 2017-140509

(51) Int. Cl.
*H01M 50/171* (2021.01)
*H01M 10/04* (2006.01)
(Continued)

(52) U.S. Cl.
CPC ..... *H01M 50/107* (2021.01); *H01M 10/0431* (2013.01); *H01M 50/152* (2021.01); *H01M 50/574* (2021.01); *H01M 50/171* (2021.01)

(58) Field of Classification Search
CPC .......... H01M 50/3425; H01M 50/578; H01M 50/574; H01M 50/107; H01M 50/152;
(Continued)

(56) References Cited

U.S. PATENT DOCUMENTS

2007/0009785 A1\* 1/2007 Kozuki ............... H01M 50/171
429/185
2012/0213611 A1\* 8/2012 Travis .................... F16B 43/00
411/372
(Continued)

FOREIGN PATENT DOCUMENTS

CN 202659694 U \* 1/2013
JP 01-134356 U 9/1989
(Continued)

OTHER PUBLICATIONS

Yu, Xuewen; CN 202659694 U; ESpacenet Patent Translate Translation (Year: 2013).\*
(Continued)

*Primary Examiner* — Dustin Q Dam
*Assistant Examiner* — Charlene Bermudez
(74) *Attorney, Agent, or Firm* — WHDA, LLP

(57) ABSTRACT

A cylindrical battery including an electrode body in which a positive electrode plate and a negative electrode plate with a separator between the electrodes are wound; an electrolyte; a bottomed cylindrical exterior can that houses the electrode body and the electrolyte; and an opening sealing body. The opening sealing body includes a terminal cap, a valve disc included in a current cut-off mechanism, and a washer having an opening at a center, interposed between the terminal cap and the valve disc, the washer has a recessed section formed in surroundings of the opening and a planar section disposed in surroundings of the recessed section on each of surfaces at both ends in a thickness direction of the
(Continued)

washer, and boundary lines each between the recessed section and the planar section of each of the surfaces of the washer are arranged to be overlapped with each other in the thickness direction.

5 Claims, 4 Drawing Sheets

(51) Int. Cl.
  *H01M 50/107* (2021.01)
  *H01M 50/152* (2021.01)
  *H01M 50/574* (2021.01)
(58) Field of Classification Search
  CPC ......... H01M 10/0431; H01M 10/0587; H01M 2200/20; H01M 10/42; H01M 10/4235; H01M 2010/4271; H01M 10/4285; H01M 10/0422; H01M 10/052; H01M 10/0525; H01M 10/283; H01M 50/40; H01M 2200/101; H01M 50/469; H01M 50/489; H01M 2200/00; H01M 2200/106; H01M 10/0477; H01M 50/531; H01M 50/569; H01M 50/581; H01M 50/583; F16B 43/00; F16B 39/24; F16B 43/001; F16K 1/34; F16K 1/465; F16K 7/20; F16K 13/00
  See application file for complete search history.

(56) References Cited

U.S. PATENT DOCUMENTS

2017/0187019 A1* 6/2017 Chun ................ H01M 10/0525
2018/0082769 A1* 3/2018 Iwai .................... H01C 1/1406

FOREIGN PATENT DOCUMENTS

| JP | 2007-27020 A | 2/2007 | |
| JP | 2008-282679 A | 11/2008 | |
| JP | 2015-510659 A | 4/2015 | |
| WO | WO-2005050759 A2 * | 6/2005 | .......... H01M 2/1252 |
| WO | 2012/118153 A1 | 9/2012 | |

OTHER PUBLICATIONS

Yu et al; "Description CN202659694U"; Machine Translation of CN 202659694 U obtained from ESpacenet Patent Translate (Year: 2013).*

Yu et al.; "A double-chamfered washer"; Machine translation of CN 202659694 U obtained from ESpacenet Patent Translate (Year: 2013).*

International Search Report dated Oct. 23, 2018, issued in Application No. PCT/JP2018/026895 (2 pages).

* cited by examiner

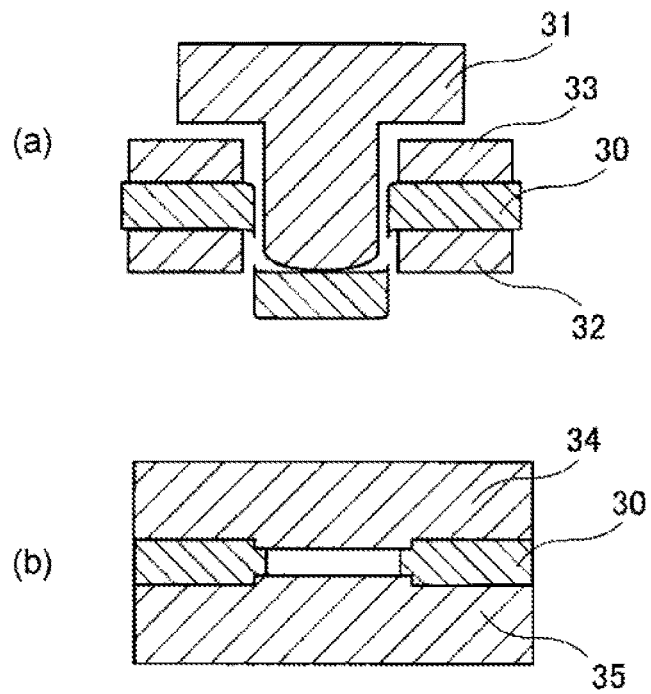
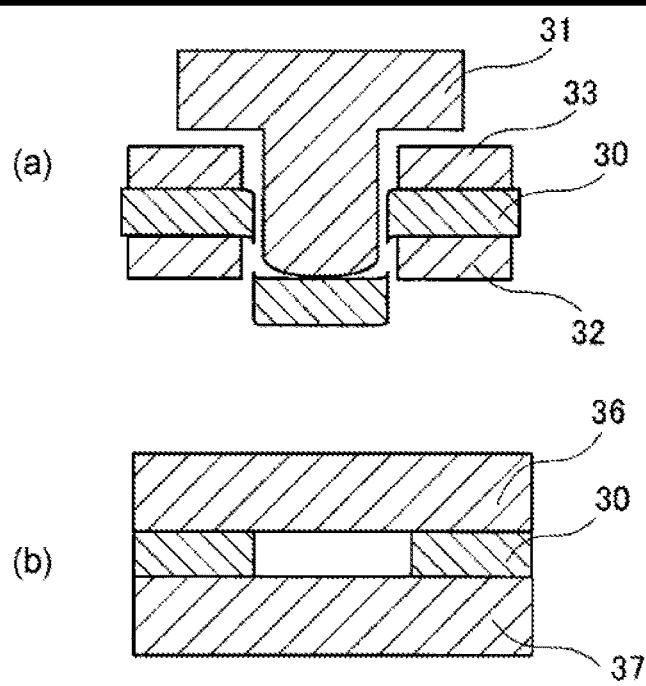

CYLINDRICAL BATTERY

TECHNICAL FIELD

The present invention relates to a cylindrical battery having a current cut-off mechanism with a reduced variation in operating pressure.

BACKGROUND ART

In recent years, due to prevalence of electric devices such as a notebook personal computer and a smartphone, various hermetically sealed batteries have been used as drive power supplies. The hermetically sealed batteries are broadly classified into cylindrical battery, rectangular battery, and pouch battery according to the shape and the material of an exterior case. The cylindrical batteries are often used for application requiring a high output, such as an electric tool, and an electric power-assisted bicycle. In particular, cylindrical non-aqueous electrolyte secondary batteries are light weighted and have a high energy density, thus have a great demand.

When a non-aqueous electrolyte secondary battery is discharged with excessive current or overcharged due to an external short circuit or failure of a charger, the internal pressure and temperature of the battery are increased by an accompanying chemical reaction such as decomposition of an electrolyte, and the battery carries a risk of breakage or ignition. Thus, a current cut-off mechanism that, when the internal pressure of the battery reaches a predetermined value, cuts off a current path inside the battery is incorporated into the inside of an opening sealing body of the cylindrical non-aqueous electrolyte secondary battery.

As disclosed in PTL 1 and PTL 2, the current cut-off mechanism includes two metal plates joined to each other, and an insulating plate interposed between those metal plates. The metal plate disposed outwardly of the battery protrudes to the metal plate disposed inwardly of the battery, and the leading end of the protrusion is joined to the metal plate disposed inwardly of the battery. When the internal pressure of the battery is increased and reaches a predetermined value, the metal plate outwardly of the battery is deformed so as to be inverted, thus the joint portion between the two metal plates is broken and a current path inside the battery is cut off. When the internal pressure of the battery is further increased, the metal plate outwardly of the battery is broken, and the gas inside the battery is discharged. In this manner, a valve disc comprised of a metal plate having flexibility is used as part of the constitutive member of the current cut-off mechanism.

CITATION LIST

Patent Literature

PTL 1: Japanese Published Unexamined Patent Application Publication No. 2007-27020
PTL 2: Japanese Published Unexamined Patent Application Publication No. 2008-282679

SUMMARY OF INVENTION

Technical Problem

A terminal cap which functions as an external terminal is disposed at part of the opening sealing body, exposed to the outside of the battery. In some cases, a conductive intermediate member having an opening at its center is disposed between the terminal cap and the valve disc included in the current cut-off mechanism. For example, in PTL 1 and PTL 2, a metal washer is disposed between the terminal cap and the valve disc.

When a metal washer is disposed between the terminal cap and the valve disc, at the time of inversion of the valve disc due to an increase in the internal pressure of the battery, the inner diameter of the innermost circumferential portion of a contact part of the metal washer with the valve disc affects the internal pressure of the battery at the time of inversion of the valve disc, in other words, the operating pressure of the current cut-off mechanism.

In general, the metal washer is produced by punching of a metal plate inserted between a punch and a die. Thus, the inner diameter of the innermost circumferential portion of a contact part of the metal washer with the valve disc seems to have the same value regardless of which one of the front and the back of the metal washer is brought into contact with the valve disc. However, when an opening portion is formed at the center of the metal washer by punching of a metal plate, droop is formed on one of the front and the back of the metal plate, and a burr is formed on the other. Thus, the inner diameter of the innermost circumferential portion of the contact part is varied and the operating pressure of the current cut-off mechanism is changed depending on which one of the front and the back of the metal washer is brought into contact with the valve disc. Thus, when an opening sealing body is produced using the front and back of the metal washer at random, the variation in the operating pressure of the current cut-off mechanism is increased. Although the variation in the operating pressure can be reduced by aligning the orientation of the metal washer when the opening sealing body is produced, such a technique causes a complicated process of manufacturing cylindrical batteries, and an increase in the manufacturing cost.

Solution to Problem

The present invention has been devised in consideration of what described above, and a cylindrical battery in an aspect of the present invention is characterized by including an electrode body in which a positive electrode plate and a negative electrode plate with a separator between the electrodes are wound; an electrolyte; a bottomed cylindrical exterior can that houses the electrode body and the electrolyte; and an opening sealing body. The opening sealing body includes a terminal cap, a valve disc included in a current cut-off mechanism, and a washer having an opening at a center, interposed between the terminal cap and the valve disc, the washer has a recessed section formed in surroundings of the opening and a planar section disposed in surroundings of the recessed section on each of surfaces at both ends in a thickness direction of the washer, and boundary lines each between the recessed section and the planar section of each of the surfaces of the washer are arranged to be overlapped with each other in the thickness direction.

Advantageous Effects of Invention

According to the present invention, the innermost circumferential portion of the contact part of the washer with the valve disc matches the boundary lines each between the planar section and the recessed section of each washer surface. The problem of varying operating pressure of the current cut-off mechanism caused by a difference between the front and the back of the washer is solved by arranging the boundary lines to be overlapped with each other in the thickness direction of the washer. Consequently, according to the present invention, it is possible to reduce the variation in the operating pressure of the current cut-off mechanism of cylindrical batteries without causing a complicated process of manufacturing the cylindrical batteries and an increase in the manufacturing cost.

BRIEF DESCRIPTION OF DRAWINGS

FIG. 6 provides schematic views illustrating a method of producing a washer according to an embodiment. FIG. 6(a) illustrates a process of forming an opening, and FIG. 6(b) illustrates a process of forming a recessed section.

FIG. 7 provides schematic views illustrating a method of producing a washer according to a comparative example, FIG. 7(a) illustrates a process of forming an opening, and FIG. 7(b) illustrates a process of planarly shaping a washer.

DESCRIPTION OF EMBODIMENTS

Hereinafter an embodiment of the present invention will be described with reference to the drawings. It is to be noted that the embodiment described below is only an example, and the present invention is not limited to the embodiment. The present invention may be modified and practiced as appropriate within a scope of its gist.

Figure 1:
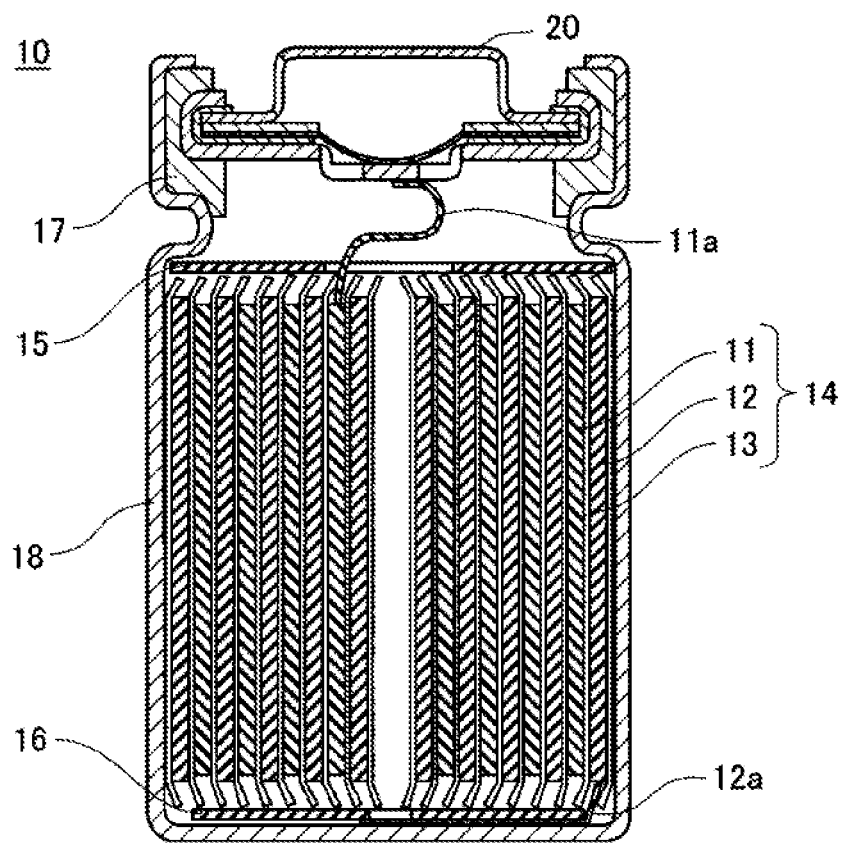
FIG. 1 is a cross-sectional view of a cylindrical non-aqueous electrolyte secondary battery according to an embodiment.

FIG. 1 is a cross-sectional view of a cylindrical non-aqueous electrolyte secondary battery 10 according to an embodiment of the present invention. An electrode body 14 and a non-aqueous electrolyte which is not illustrated are housed in a bottomed cylindrical exterior can 18. Insulating plates 15, 16 are disposed above and below the electrode body 14, respectively. The inside of the battery is hermetically sealed by caulking-fixing an opening sealing body 20 to the opening of the exterior can 18 via a gasket 17.

The electrode body 14 has a winding structure of a positive electrode plate 11 and a negative electrode plate 12. A separator 13 is interposed between the positive electrode plate 11 and the negative electrode plate 12. A positive electrode lead 11a and a negative electrode lead 12a are connected to the positive electrode plate 11 and the negative electrode plate 12, respectively. The positive electrode lead 11a is connected to the opening sealing body 20, and the negative electrode lead 12a is connected to the bottom of the exterior can 18. A publicly known material used for a non-aqueous electrolyte secondary battery may be selectively used as appropriate for the positive electrode plate 11, the negative electrode plate 12, and the separator 13.

Figure 2:
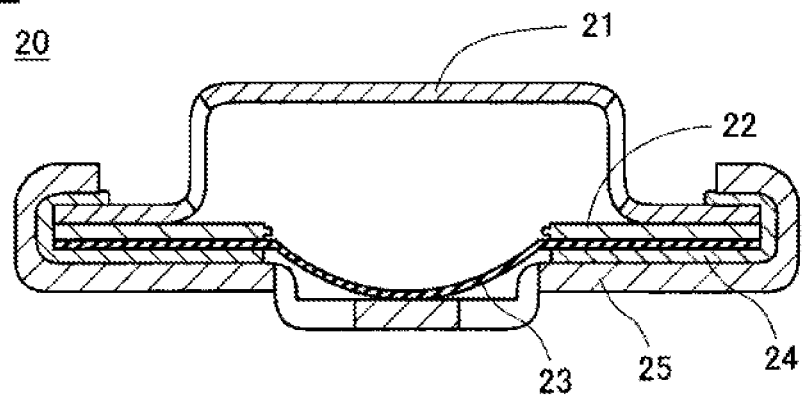
FIG. 2 is a cross-sectional view of an opening sealing body according to an embodiment.

As illustrated in FIG. 2, the opening sealing body 20 includes a terminal cap 21, a washer 22, a valve disc 23, an inner gasket 24, and an internal terminal plate 25. The terminal cap 21, the washer 22, and the valve disc 23 are caulking-fixed to the outer circumferential portion of the internal terminal plate 25 via the inner gasket 24. An insulating resin is used for the inner gasket 24, and a current path from the internal terminal plate 25 to the terminal cap 21 is ensured by mutual joint between the valve disc 23 and the internal terminal plate 25. A vent is provided in the internal terminal plate 25, thus when the internal pressure of the battery is increased, the valve disc 23 receives the pressure. When the internal pressure of the battery reaches a predetermined value, the joint portion between the valve disc 23 and the internal terminal plate 25 is broken and the current path inside the battery is cut off. When the internal pressure of the battery is further increased, the valve disc 23 is broken, and the gas inside the battery is discharged through the vent provided in the terminal cap 21.

It is preferable that a metal material, which can stably exist even under exposure to a non-aqueous electrolyte, be used for the valve disc 23 and the internal terminal plate 25. As such a metal material, aluminum and aluminum alloy are exemplified. The valve disc 23 and the internal terminal plate 25 can be joined to each other by ultrasonic welding or laser welding, it is preferable that an insulating resin material be used for the inner gasket 24 interposed between the valve disc 23 and the internal terminal plate 25. As such a resin material, polyethylene, polypropylene, polybutylene terephthalate, and polyphenylene sulfide are exemplified.

The current cut-off mechanism can be formed by including three members: a valve disc that is deformable along with an increase in the internal pressure of the battery, a conductive member that is joined to the battery inner-side surface of the valve disc, and an insulating member interposed between those members. In the present embodiment, the current cut-off mechanism includes the valve disc 23, the internal terminal plate 25, and the inner gasket 24 interposed between those members. However, the current cut-off mechanism of the present invention is not limited to this configuration. For example, a metal plate is interposed between the valve disc and the internal terminal plate, and instead of the internal terminal plate, the metal plate can be used as a constitutive member of the current cut-off mechanism. A thin-walled portion is provided as an easily breakable portion in the metal plate, and the thin-walled portion may serve as a current cut-off unit.

The terminal cap 21 and the washer 22 are exposed to atmosphere at a positive electrode potential, thus it is preferable to use a metal material excellent in oxidation resistance, and as such a metal, nickel, nickel-plated iron, and stainless steel are exemplified. For the washer 22, it is possible to use not only a metal material, but also a PTC element (Positive Temperature Coefficient) in which for example, a conductive powder and a resin are mixed and molded.

Figure 3:
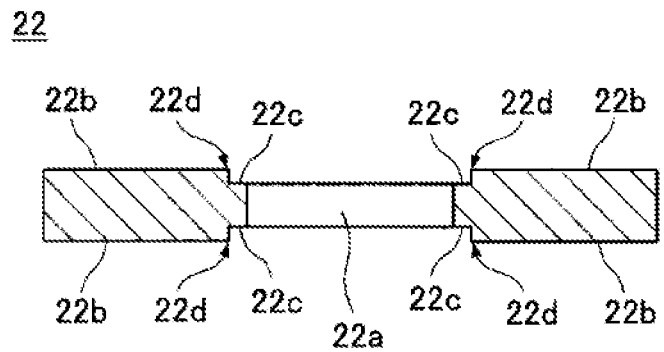
FIG. 3 is a cross-sectional view of a washer according to an embodiment.
Figure 4:
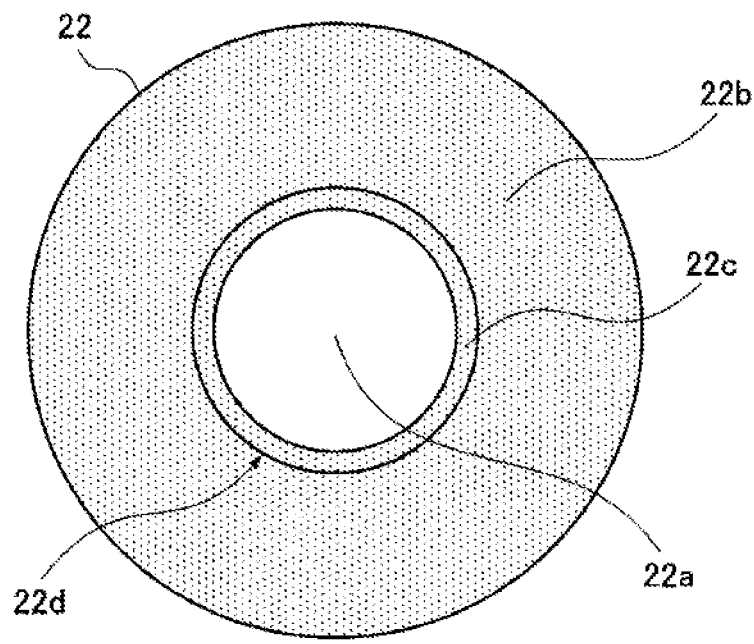
FIG. 4 is a plan view of the washer according to an embodiment.

As illustrated in FIG. 3 and FIG. 4, a recessed section 22c is formed in the surroundings of an opening 22a in each surface of the washer 22. A planar section 22b, in which the surface of the washer 22 is flat, is disposed in the surroundings of the recessed section 22c. When the recessed section 22c is formed, the outermost circumferential portion of the contact part of the washer 22 with the valve disc 23 matches boundary lines 22d each between the recessed section 22c and the planar section 22b. In the present embodiment, the planar shape of each boundary line 22d is circular. It is preferable that the planar shape of the boundary line 22d be a shape similar to a circular shape. The boundary lines 22d formed on respective surfaces of the washer 22 are arranged to be overlapped with each other in the thickness direction of the washer 22.

In the recessed section 22c, a bottom section is present where the remaining wall thickness of the washer 22 is constant. Thus, a step is formed from the planar section 22b toward the opening 22a. Such a step contributes to quick inversion of the valve disc 23 at the time of operation of the current cut-off mechanism, thus it is preferable that a step be formed from the planar section 22b toward the opening 22a. When a step is formed, an inclined surface may be interposed between the planar section 22b and the bottom section, or a curved section may be interposed between the planar section 22b and the bottom section.

Figure 5:
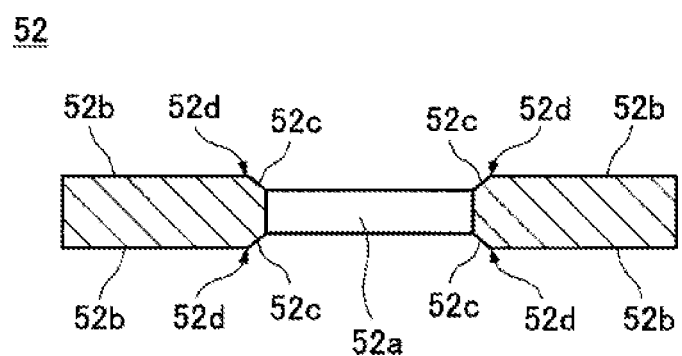
FIG. 5 is a cross-sectional view of a washer according to another embodiment.

FIG. 5 is a cross-sectional view of a washer 52 according to another embodiment of the present invention. As illustrated in FIG. 5, a recessed section 52c consisting of only an inclined surface may be formed between a planar section 52b and an opening 52a. In this case, although a step is not formed from the planar section 52b toward the opening 52a, the boundary line 52d is clearly formed between the planar section 52b and the recessed section 52c, thus an effect similar to the effect of the washer 22 of the above-described embodiment is produced.

Here, an example of a method of manufacturing the washer 22 according to an embodiment will be described with reference to FIG. 6. FIG. 6 provides schematic views illustrating a method of forming the opening 22a at the center of the washer 22 and the recessed section 22c in the surroundings of the opening 22a by machine pressing in a metal plate 30 which is a raw material of the washer 22. First, the metal plate 30 is fixed to a die 32 by a holding jig 33. Then the opening 22a is formed in the metal plate 30 by punching the metal plate 30 with a punch 31 to an opening of the die 32 (FIG. 6(a)). In that moment, droop is formed on one surface of the metal plate 30, and a burr is formed on the other surface. Next, the metal plate 30 is machine pressed using press jigs 34, 35 having planar projections with an area larger than the opening 22a formed in the metal plate 30, and the recessed section 22c is formed in the surroundings of the opening 22a (FIG. 6(b)). Finally, the washer 22 is produced by punching the position corresponding to the outer circumferential portion of the washer 22 of the metal plate 30.

The method of producing a washer is not limited to the machine punching of a metal plate as described above. For example, a washer may be produced by molding to cast a metal material as a raw material into a mold for shaping. In the case of molding, it is less likely that droop is formed on one of the front and the back of the washer and a burr is formed on the ether. However, a burr may be formed only on one of the front and the back of the washer. According to the present invention, it is possible to prevent the effect of such a burr and to prevent the change in the operating pressure of the current cut-off mechanism caused by a difference between the front and the back of the washer. In this manner, even when a washer is produced by a method other than the machine punching, the effect of reducing the variation in the operating pressure of the current cut-off mechanism is produced.

EXAMPLE

The washer 22 was produced by machine punching of the metal plate 30 made of nickel. First, as illustrated in FIG. 6(a), the opening 22a was formed in the metal plate 30, and subsequently, as illustrated in FIG. 6(b), the recessed section 22c is formed in the surroundings of the opening 22a. The planar shape of the opening 22a and the recessed section 22c was circular. Finally, the metal plate 30 was punched along a circle with a predetermined radius from the center of the opening 22a, and the washer 22 with an outer diameter of 15.5 mm was produced. The inner diameter of the opening 22a was 6.0 mm, and the diameter of the circle formed by the boundary line 22d between the planar section 22b and the recessed section 22c of the washer 22 was 6.4 mm.

As illustrated in FIG. 2, the terminal cap 21, the washer 22, the valve disc 23, the inner gasket 24, and the internal terminal plate 25 were used as the constitutive members of the opening sealing body 20. The inner gasket 24 and the valve disc 23 were stacked on the internal terminal plate 25 made of an aluminum plate, and the internal terminal plate 25 and the valve disc 23 are joined at respective central portions. An aluminum foil is used for the valve disc 23. Furthermore, the washer 22 and the terminal cap 21 were stacked on the valve disc 23, a flange portion of the terminal cap 21 was caulking-fixed with the internal terminal plate 25 via the inner gasket 24, and the opening sealing body 20 according to the embodiment was produced. A nickel-plated iron plate was used for the terminal cap 21.

Comparative Example

Figure 8:
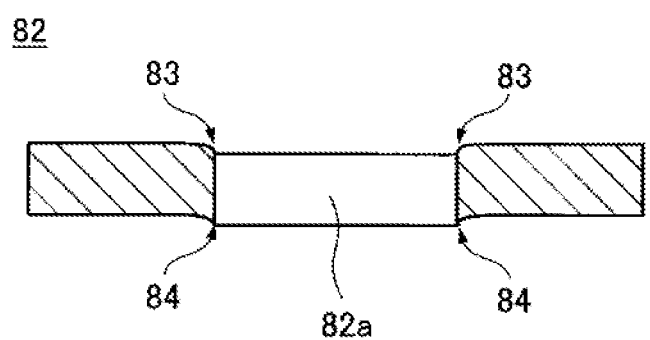
FIG. 8 is a cross-sectional view of a washer according to a comparative example.

Similarly to the example, in a washer 82 of a comparative example, an opening 82a was first formed by machine punching of the metal plate 30 made of nickel. Next, instead of forming a recessed section in the surroundings of the opening 82a, the metal plate 30 was planarly shaped by pressing the entire surface thereof using press jigs 36, 37 having a flat surface (FIG. 7(b)). Finally, the metal plate 30 was punched along a circle with a predetermined radius from the center of the opening 82a, and a washer 82 with an outer diameter of 15.5 mm as illustrated in FIG. 8 was produced. The inner diameter of the opening 82a of the washer 32 was 6.4 mm. The inner diameter matches the diameter of the circle formed by the boundary line 22d between the planar section 22b and the recessed section 22c of the washer 22. It is to be noted that droop 83 is formed on one of the front and the back of the washer 82 and a burr 84 is formed on the other in the comparative example. In the process of the above-described planarly shaping, the droop 83 and/or the burr 84 were not eliminated.

An opening sealing body according to the comparative example was produced in a similar manner in the embodiment except that the washer 82 produced as describe above was used.

It is to be noted that in the embodiment, the process of forming the recessed section illustrated in FIG. 6(b) also has a function of the planarly shaping. Therefore, according to the method of manufacturing a washer in the embodiment, the recessed section can be formed without increasing the number of manufacturing processes of a washer, as compared with the comparative example.

(Measurement of Operating Pressure of Current Cut-off Mechanism)

Hermetically sealed space was formed by bringing a mold having a hollow into contact with the internal terminal plate side of the opening sealing body. A gas was supplied to the hermetically sealed space through a gas supply path, and the operating pressure of the current cut-off mechanism in simulation of an increased internal pressure of the battery was measured. The operating pressure of the current cut-off mechanism was defined as the pressure of the hermetically sealed space when the electric resistance between the opening sealing body and the internal terminal plate became higher than the electric resistance before the measurement of the operating pressure by 1Ω while the pressure of the hermetically sealed space was increased at a constant rate. In each of the example and the comparative example, 20 operating pressures (MPa) of the opening sealing body were measured, the standard deviation (σ) was calculated, and the variations in the example and the comparative example were compared. The result is shown in Table 1. It is to be noted that the orientation of the front and the back of the washer is set in random in the opening sealing body used for measurement of the operating pressure.

TABLE 1

| | Standard Deviation of Operating Pressure |
|---|---|
| Example | 0.03 |
| Comparative Example | 0.08 |

As illustrated in Table 1, the standard deviation of the operating pressure of the current cut-off mechanism of the embodiment is significantly reduced from the standard deviation of the comparative embodiment, and it is seen that the formation of the recessed section in the surroundings of the opening of the washer significantly contributes to the reduction in the variation in the operating pressure. In contrast, droop is formed on one of the front and the back of the washer and a burr is formed on the other in the comparative example. Since the operating pressure of the current cut-off mechanism is changed due to a difference between the front and the back of the washer, it is estimated that the variation in the operating pressure of the current cut-off mechanism is increased when the front and the back of the washer is used in random at the time of producing the opening sealing body.

It is clear that the effect of the present invention does not depend on the material of the electrode body and the electrolyte housed inside the exterior can. Consequently, it is possible to apply the present invention not only to a non-aqueous electrolyte secondary battery, but also to another cylindrical battery such as a nickel-cadmium battery and a nickel-metal hydride battery.

INDUSTRIAL APPLICABILITY

According to the present invention, it is possible to implement a high-quality cylindrical battery with a reduced variation in the operating pressure of the current cut-off mechanism, thus the industrial applicability of the present invention is high.

REFERENCE SIGNS LIST

10 CYLINDRICAL NON-AQUEOUS ELECTROLYTE SECONDARY BATTERY
14 ELECTRODE BODY
18 EXTERIOR CAN
20 OPENING SEALING BODY
21 TERMINAL CAP
22 WASHER
22a OPENING
22b PLANAR SECTION
22c RECESSED SECTION
22d BOUNDARY LINE
23 VALVE DISC
24 INNER GASKET
25 INTERNAL TERMINAL PLATE

The invention claimed is:

1. A cylindrical battery comprising: an electrode body in which a positive electrode plate and a negative electrode plate with a separator between the electrodes are wound; an electrolyte; a bottomed cylindrical exterior can that houses the electrode body and the electrolyte; and an opening sealing body,
wherein the opening sealing body includes a terminal cap, a valve disc included in a current cut-off mechanism, and a washer having an opening at a center, interposed between the terminal cap and the valve disc,
the valve disc is configured to receive an internal pressure of the cylindrical battery before the current cut-off mechanism operates,
the washer has a first surface, and a second surface facing the valve disc and opposite the first surface in a thickness direction of the washer,
the first surface includes a first recessed section formed in an annular shape directly adjacent to and along an entire surrounding of the opening, and a first planar section disposed in a surrounding of the first recessed section,
the second surface includes a second recessed section formed in an annular shape directly adjacent to and along the entire surrounding of the opening, and a second planar section disposed in a surrounding of the second recessed section,
a boundary line between the first recessed section and the first planar section on the first surface and a boundary line between the second recessed section and the second planar section on the second surface overlap each other in the thickness direction of the washer,
the boundary lines are circular,
a gap is present between the second recessed section and the valve disc, and
the first recessed section and the second recessed section are formed within a monolithic structure of the washer and are tapered toward the opening in a near identical manner.

2. The cylindrical battery according to claim 1, wherein a step is formed in the boundary lines.

3. The cylindrical battery according to claim 2, wherein a thickness of each of the first recessed section and the second recessed section is constant.

4. The cylindrical battery according to claim 1, wherein each of the first recessed section and the second recessed section has an inclined portion with a thickness which is reduced from the boundary lines toward the opening.

5. The cylindrical battery according to claim 1, wherein an entirety of the washer, including the first recessed section, the first planar section, the second recessed section, and the second planar section, is integrally formed of a single piece of material.

* * * * *